(12) United States Patent
Yamamoto et al.

(10) Patent No.: US 12,260,073 B2
(45) Date of Patent: Mar. 25, 2025

(54) POSTING INFORMATION PROCESSING DEVICE AND POSTING INFORMATION PROCESSING METHOD

(71) Applicant: Kabushiki Kaisha F.C.C., Hamamatsu (JP)

(72) Inventors: Shingo Yamamoto, Hamamatsu (JP); Hidemasa Suzuki, Hamamatsu (JP); Hokuto Kurosawa, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 2 days.

(21) Appl. No.: 17/738,212

(22) Filed: May 6, 2022

(65) Prior Publication Data

US 2023/0042368 A1 Feb. 9, 2023

(30) Foreign Application Priority Data

Aug. 5, 2021 (JP) .................. 2021-128788

(51) Int. Cl.
*G06F 3/048* (2013.01)
*G06F 3/04842* (2022.01)
(Continued)

(52) U.S. Cl.
CPC ...... *G06F 3/04842* (2013.01); *G06F 16/5866* (2019.01); *G06Q 50/01* (2013.01); *G06T 11/60* (2013.01)

(58) Field of Classification Search
CPC . G06F 3/04842; G06F 16/5866; G06Q 50/01; G06T 11/60
See application file for complete search history.

(56) References Cited

U.S. PATENT DOCUMENTS

2007/0081090 A1\* 4/2007 Singh ................... H04N 23/631
2010/0153848 A1\* 6/2010 Saha .................... G06F 16/9562
709/219

(Continued)

FOREIGN PATENT DOCUMENTS

JP 2009-140020 A 6/2009
JP 2011180765 A 9/2011

(Continued)

OTHER PUBLICATIONS

Japanese Office Action issued on Feb. 4, 2025 for counterpart Japanese Application No. 2021-128788.

*Primary Examiner* — Patrick F Riegler
(74) *Attorney, Agent, or Firm* — POLSINELLI PC

(57) ABSTRACT

Provided is a system that enables additional information to be further posted in a state of being annexed to a posting image. The system includes: a posting-side annexed posting information registration unit that registers annexed posting information provided from a poster of the posting image in association with a position designated by the poster in the posting image; and a viewing-side annexed posting information registration unit that registers annexed posting information provided from a viewer of the posting image in association with a position designated by the viewer among the poster designation position and other positions. The poster can post annexed posting information by designating a position where the poster desires to get evaluation, and the viewer can post annexed posting information in association with the poster designation position, or can post the annexed posting information by designating a position where the viewer desires to perform evaluation or to make a comment.

10 Claims, 7 Drawing Sheets

(51) Int. Cl.
  *G06F 16/58*     (2019.01)
  *G06Q 50/00*     (2012.01)
  *G06T 11/60*     (2006.01)

(56) References Cited

U.S. PATENT DOCUMENTS

| | | | |
|---|---|---|---|
| 2011/0158605 A1* | 6/2011 | Bliss | H04N 21/4524 386/E5.003 |
| 2011/0211728 A1 | 9/2011 | Inose | |
| 2012/0151320 A1* | 6/2012 | McClements, IV | G06Q 10/101 715/230 |
| 2012/0151347 A1* | 6/2012 | McClements, IV | G11B 27/34 715/716 |
| 2012/0210252 A1* | 8/2012 | Fedoseyeva | G06Q 10/06398 715/753 |
| 2012/0260163 A1* | 10/2012 | Kim | G06F 3/04883 715/273 |
| 2013/0145269 A1* | 6/2013 | Latulipe | G06F 3/048 715/720 |
| 2013/0212507 A1* | 8/2013 | Fedoseyeva | G06Q 30/00 715/765 |
| 2014/0013241 A1* | 1/2014 | Brown | G06Q 30/0282 715/753 |
| 2014/0040776 A1* | 2/2014 | Dann | G06F 3/0485 715/753 |
| 2014/0181197 A1* | 6/2014 | Baggott | G06Q 10/10 709/204 |
| 2016/0019195 A1* | 1/2016 | Sultanik | G06F 16/958 715/202 |
| 2016/0127283 A1* | 5/2016 | Huang | H04L 51/10 715/720 |
| 2017/0004139 A1* | 1/2017 | Wong | G09B 5/02 |
| 2018/0246739 A1 | 8/2018 | Ishinada | |
| 2020/0412682 A1* | 12/2020 | Trim | G06Q 10/10 |
| 2023/0042368 A1* | 2/2023 | Yamamoto | G06Q 50/01 |

FOREIGN PATENT DOCUMENTS

| | | |
|---|---|---|
| JP | 2014238663 A | 12/2014 |
| JP | 2017049919 A | 3/2017 |
| JP | 2020-512650 A | 4/2020 |

* cited by examiner

POSTING INFORMATION PROCESSING DEVICE AND POSTING INFORMATION PROCESSING METHOD

CROSS REFERENCE TO RELATED APPLICATIONS

This application claims priority to Application No. 2021-128788 filed in Japan on Aug. 5, 2021. The entire contents of each application are hereby incorporated by reference.

BACKGROUND OF THE INVENTION

Field of the Invention

The present invention relates to a posting information processing device and a posting information processing method, and particularly, to a posting information processing device and a posting information processing method which are suitable for a system in which information such as a comment and evaluation can be further posted in a state of being annexed to a posting image.

DESCRIPTION OF THE RELATED ART

In the related art, with respect to contents provided in an Internet-based social network service (SNS), there is known a system that allows a viewer to evaluate the contents by clicking a "like" button or to write a comment (for example, refer to JP-T-2020-512650 (the term "JP-T" as used herein means a published Japanese translation of a PCT patent application)). In addition, there is also known a system in which an annotation including an arbitrary input text can be added to a designated position in an article displayed on a web page (for example, refer to JP-A-2009-140020).

In the technology described in JP-T-2020-512650, in a case where only the "like" button is clicked by a viewer, a poster of the contents can recognize that the viewer gives a high evaluation to the contents, but it is difficult to recognize what is highly evaluated in the contents. On the other hand, when using the technology described in JP-A 2009-140020, the poster of the contents can recognize which part of the contents is evaluated by confirming an annotation applied to an arbitrary designated position.

By the way, it cannot be said that a part where the poster of the contents desires to get evaluation and a part where the viewer of the contents performs evaluation match each other. However, the systems described in JP-T-2020-512650 and JP-A-2009-140020 do not provide an annotation applying mechanism in consideration of the above-described situations. Accordingly, there is a problem that the poster of the contents does not always get an evaluation related to an expected part. In addition, there is a problem that the viewer can only feed back his impressions or the like for the contents to the poster, and cannot do any more.

SUMMARY OF THE INVENTION

The invention has been made in consideration of such problems, and an object, thereof is to provide a posting mechanism that is expected to increase satisfaction for both a poster and a viewer of contents.

To solve the problem, in the invention, a system enabling additional information to be further posted in a state of being annexed to a posting image is provided with a function of registering annexed posting information (posting-side annexed posting information) provided from a poster of the posting image in association with a position designated by the poster in the posting image (poster designation position); and a function of registering annexed posting information (viewing-side annexed posting information) provided from a viewer of the posting image in association with a position designated by the viewer (viewer designation position) among the poster designation position and other positions.

According to the invention configured as described above, a poster of a posting image can post annexed posting information by designating, for example, a position where the poster desires to get evaluation, and when performing this posting, posting-side annexed posting information is registered in association with a poster designation position. On the other hand, for example, the viewer of the posting image can post annexed posting information in association with the poster designation position after viewing the posting-side annexed posting information at the poster designation position or can post annexed posting information by designating an additional position where the viewer desires to perform evaluation, comment, or the like. When performing this posting, the viewing-side annexed posting information is registered in association with the viewer designation position. Accordingly, it is possible to make a situation in which the annexed posting information from the viewer is likely to be posted to the position where the poster particularly desires to get evaluation in the posting image, and the viewer can post annexed posting information to a desired position (including any of the poster designation position and other positions) while referring to the posting-side annexed posting information. As described above, according to the invention, it is possible to provide a posting mechanism that is expected to increase satisfaction for both the poster and the viewer of the posting image.

DETAILED DESCRIPTION OF THE INVENTION

Hereinafter, an embodiment of the invention will be described with reference to the accompanying drawings.

Figure 1:
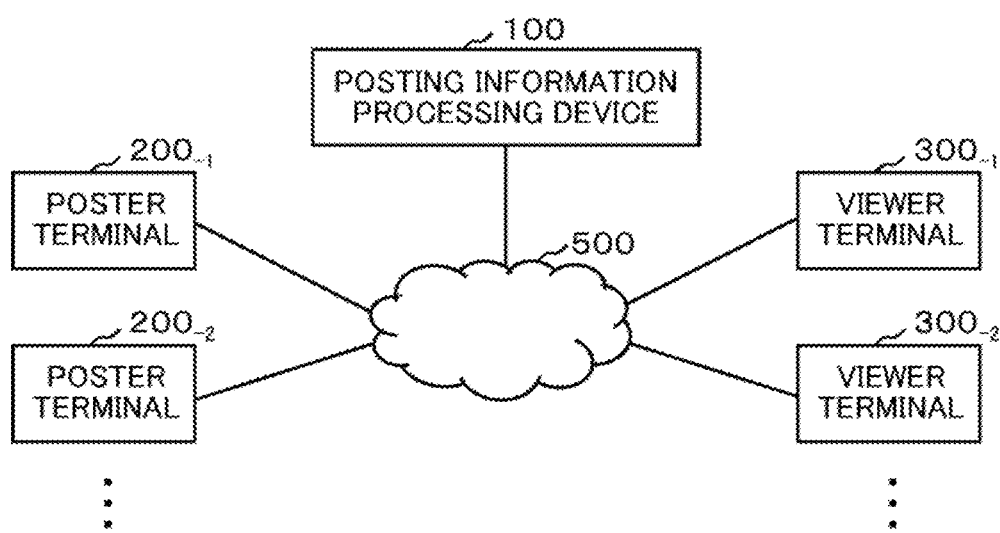
FIG. 1 is a view illustrating an overall configuration example of a posting information providing system to which a posting information processing device according to an embodiment is applied.

FIG. 1 is a view illustrating an overall configuration example of a posting information providing system to which a posting information processing device according to this embodiment is applied. The posting information providing system of this embodiment accepts posting of an image of a finished product of a product (for example, a plastic model) produced through a series of production processes, and provides the posting image to a user. The posting information providing system of this embodiment can further post additional information in a state of being annexed to the posting image, and the posted information annexed to the posting image (hereinafter, also referred to as "annexed posting information) is also provided to the user.

As illustrated in FIG. 1, the posting information providing system of this embodiment includes a posting information processing device 100, a plurality of poster terminals 200$_{-1}$, 200$_{-2}$, . . . (hereinafter, simply referred to as "poster terminals 200" when not being particularly distinguished), and a plurality of viewer terminals 300$_{-1}$, 300$_{-2}$, . . . (hereinafter, simply referred to as "viewer terminals 300" when not being particularly distinguished). The posting information processing device 100, the poster terminals 200, and the viewer terminals 300 are connected to each other through a communication network 500 such as the Internet and a portable telephone network.

The poster terminals 200 are terminals which are used by a plurality of posters who post a posting image, and examples thereof include a PC, a tablet, or a smartphone. As to be described later, the posters can post the posting image to the posting information processing device 100 by using the poster terminal 200, and can also post annexed posting information to the posting information processing device 100 in a state of being annexed to the posting image.

The viewer terminals 300 are terminals which are used by a plurality of viewers who view the posting image, and examples thereof include a PC, a tablet, or a smartphone. As to be described later, the viewers can view the posting image by using the viewer terminals 300, and can also post annexed posting information to the posting information processing device 100 in a state of being annexed to the posting image.

Note that, in the following description, the posters and the viewers may be collectively noted as users. In addition, the poster terminals 200 and the viewer terminals 300 may be collectively noted as user terminals 200, 300. In addition, here, for convenience of explanation, classification is made into a poster (poster terminal 200) and a viewer (viewer terminal 300), but a poster who posts an arbitrary posting image may be a viewer of a posting image posted by another poster. That is, the poster terminal 200 may be the viewer terminal 300, and the viewer terminal 300 may be the poster terminal 200.

The posting information processing device 100 has a web server function, acquires a posting image from the poster terminal 200 and retains the posting image, and provides the posting image in correspondence with a request from the poster terminal 200 or the viewer terminal 300. Description of "provides a posting image" represents that the posting image is displayed on a web browser of the poster terminal 200 or the viewer terminal 300. In addition, the posting information processing device 100 acquires annexed posting information from the poster terminal 200 or the viewer terminal 300 and retains the annexed posting information, and provides the annexed posting information in correspondence with a request from the poster terminal 200 or the viewer terminal 300. Description of "provides an annexed posting information" represents that annexed posting information is displayed on a web browser of the poster terminal 200 or the viewer terminal 300 in combination with the posting image.

Figure 2:
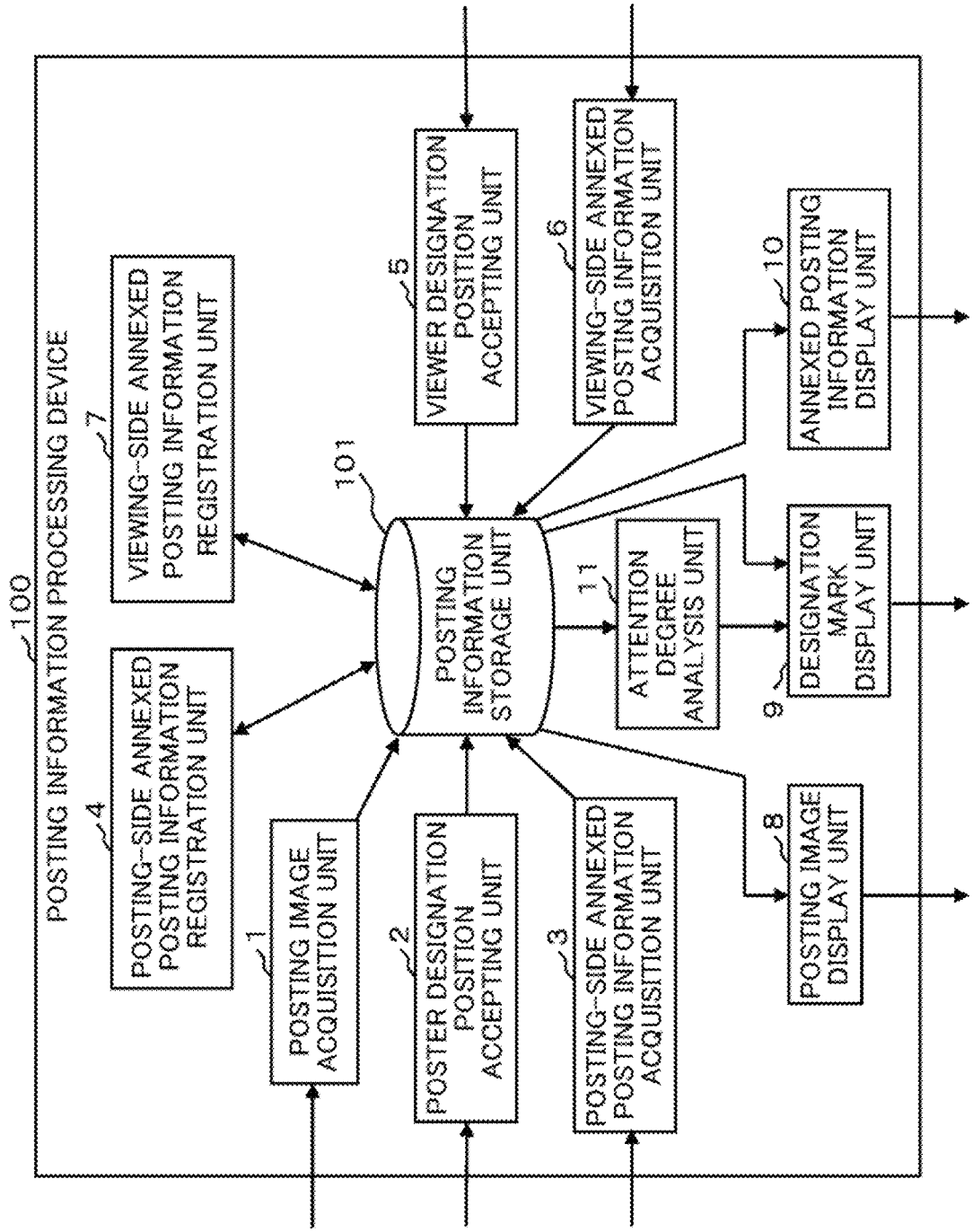
FIG. 2 is a block diagram illustrating a functional configuration example of the posting information processing device according to this embodiment.

FIG. 2 is a block diagram illustrating a functional configuration example of the posting information processing device 100. As illustrated in FIG. 2, the posting information processing device 100 according to this embodiment includes a posting image acquisition unit 1, a poster designation position accepting unit 2, a posting-side annexed posting information acquisition unit 3, a pasting-side annexed posting information registration unit 4, a viewer designation position accepting unit 5, a viewing-side annexed posting information acquisition unit 6, a viewing-side annexed posting information registration unit 7, a posting image display unit 8, a designation position mark display unit 9, an annexed posting information display unit 10, and an attention degree analysis unit 11 as a functional configuration. In addition, the posting information processing device 100 according to this embodiment includes a posting information storage unit 101 as a storage medium.

The functional blocks 1 to 11 can be constituted by any of hardware, a digital signal processor (DSP), and software. For example, when being constituted by software, the functional blocks 1 to 11 actually include a CPU, a RAM, a ROM, and the like of a computer, and are realized when a program stored in a storage medium such as a RAM, a ROM, a hard disk, and a semiconductor memory operates.

The posting image acquisition unit 1 acquires a posting image provided from the poster terminal 200. For example, the posting image acquisition unit 1 provides an upload screen of the posting image in correspondence with a request from the poster terminal 200, and acquires a posting image uploaded from the poster terminal 200 through the upload screen. The posting image acquisition unit 1 stores the acquired posting image in the posting information storage unit 101 in association with identification information capable of uniquely identifying a poster (hereinafter, referred to as "poster ID") and identification information capable of uniquely identifying the posting image (hereinafter, referred to as "posting image ID"). As the poster ID, for example, identification information that is set in user registration when a poster uses a service of a posting information providing system can be used. This is also true of the viewer ID to be described later. The posting image ID is identification information that is set when the posting image acquisition unit 1 acquires a posting image.

Figure 3A:
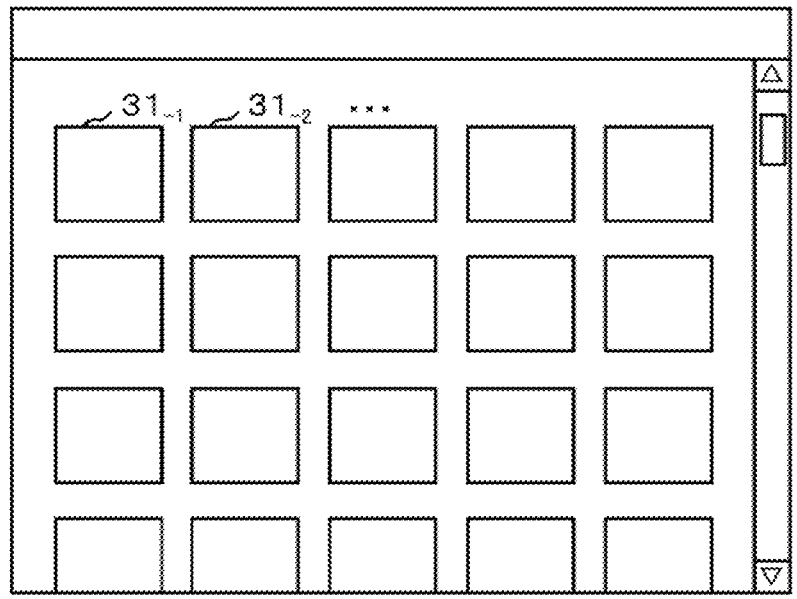
FIGS. 3A and 3B are views illustrating an example of a posting image display screen provided by a posting image display unit of this embodiment.
Figure 3B:
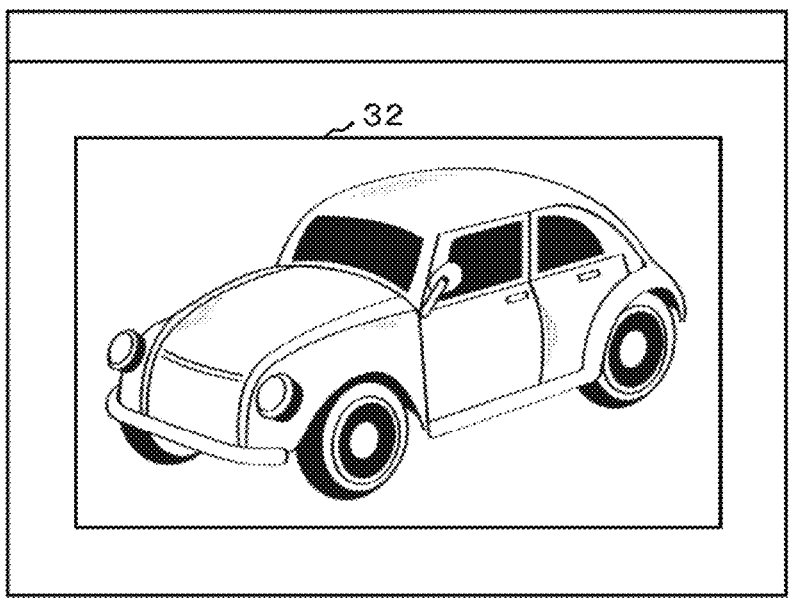

The posting image display unit 8 displays the posting image stored in the posting information storage unit. 101 on the user terminal 200, 300 in correspondence with a request from the user terminal 200, 300. FIGS. 3A and 3B are views illustrating an example of a posting image display screen that is provided by the posting image display unit 8. FIG. 3A is a view illustrating an example of a list display screen that displays a plurality of thumbnail images 31$_{-1}$, 31$_{-2}$, . . . of a plurality of posting images stored in the posting information storage unit 101 side by side. A user can select any one among the plurality of thumbnail images 31$_{-1}$, 31$_{-2}$, . . . which are displayed as a list.

A hyperlink is set to the thumbnail images 31$_{-1}$, 31$_{-2}$, . . . , and when selecting a desired thumbnail image by a clicking or tapping operation, it transitions to a screen on which a posting image corresponding to the selected thumbnail image is displayed alone. FIG. 3B is view illustrating an example of an individual display screen that is displayed after transitioning from the list display screen. As illustrated in FIG. 3B, in the individual display screen, one posting image 32 selected by a user is displayed alone in an enlarged manner. Note that, FIG. 3B illustrates a display state in which annexed posting information is not registered to the posting image 32 yet.

The poster designation position accepting unit 2 accepts position designation performed by a poster in the posting image 32 displayed as in FIG. 3B. For example, the position designation can be performed by an operation in which a poster moves a mouse cursor to a desired position in the posting image and clicks or an operation in which the poster taps a desired position in the posting image with a finger. The position that is designated in the posting image by the poster may be a region where a product exists or a background region where the product does not exist.

The poster designation position accepting unit 2 detects information indicating a position that is designated by a poster in the posting image (hereinafter, referred to as "poster designation position"). The information indicating the poster designation position is, for example, coordinate information in an XY coordinate system in the posting image. As an example, in an KY coordinate system in which an upper and left corner of rectangular frames partitioning the posting image 32 illustrated in FIG. 3B is set as the origin, the poster designation position accepting unit 2 detects coordinate information indicating a position where the poster moves a mouse cursor and clicks, or a position that is tapped with a finger.

The posting-side annexed posting information acquisition unit 3 acquires annexed posting information (hereinafter, referred to as "posting-side annexed posting information") that is provided from the poster of the posting image in an aspect of being annexed to the poster designation position detected by the poster designation position accepting unit 2 from the poster terminal 200. For example, the poster can perform an operation of posting the posting-side annexed posting information to the posting information processing device 100 in succession to the operation of designating the desired position in the posting image. The posting-side annexed posting information acquisition unit 3 acquires the posting-side annexed posting information provided from the poster terminal 200 through the posting operation performed by the poster.

Figure 4:
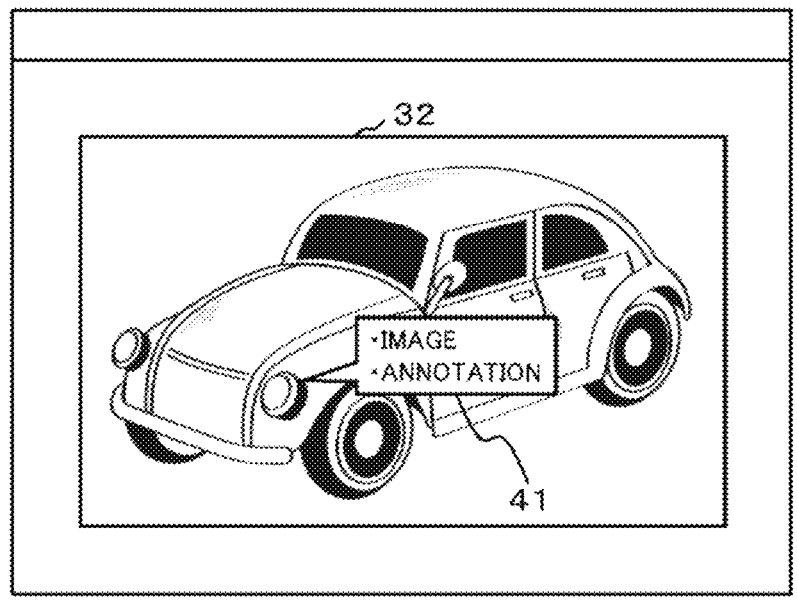
FIG. 4 is a view illustrating a screen example in an operation process when a poster posts posting-side annexed posting information.

FIG. 4 is a view illustrating a screen example in an operation process when the poster posts the posting-side annexed posting information. For example, when the poster moves a mouse cursor to a desired position in the posting image 32 and clicks a right button, a pop-up menu 41 as illustrated in FIG. 4 is displayed at the operation position. The pop-up menu 41 may be displayed in correspondence with an operation in which the poster long-presses a desired position in the posting image 32 with a finger, an operation of double-tapping the position, or the like. An "image" and an "annotation" are displayed in the pop-up menu 41 as a selection item, and the poster can post annexed posting information by selecting any one of the image and the annotation.

For example, in a case where the poster selects the item of "image", a screen for uploading an image is displayed, and a desired image can be uploaded to the posting information processing device 100 through the screen. An uploading image is arbitrary. For example, an enlarged image of a product portion corresponding to the poster designation position can be set as the uploading image. In addition, an image of a production process in the product portion corresponding to the poster designation position can also be set as the uploading image.

On the other hand, in a case where the poster selects the item of "annotation, a screen for uploading the annotation is displayed, and a desired annotation (character information) that is input through the screen can be uploaded to the posting information processing device 100. The content of the input annotation is arbitrary. For example, it is possible to post characteristics of a product portion corresponding to the poster designation position, tips for production, a point to which particular attention is given in production, difficulties and ingenuity for expression of a work, or the like as the annotation. Note that, an input column of the annotation may be provided in the image uploading screen, and an annotation may be uploaded in combination with the image. The annotation in this case can be set as an annotation for an image of a production process in a product portion corresponding to the poster designation position.

The posting-side annexed posting information registration unit 4 registers annexed posting information provided from the poster of the posting image (posting-side annexed posting information acquired from the poster terminal 200 by the posting-side annexed posting information acquisition unit 3) in association with the poster designation position detected by the poster designation position accepting unit 2. That is, in a case where the annexed posting information is posted in an aspect of being annexed to the poster designation position by the poster (in a case where the annexed posting information is uploaded in succession to designation of a position in the posting image), the posting-side annexed posting information registration unit 4 stores the coordinate information of the poster designation position and the uploaded posting-side annexed posting information in the posting information storage unit 101 in association with the poster ID and the posting image ID.

The viewer designation position accepting unit 5 accepts position designation performed by a viewer in the posting image 32 displayed as in FIG. 3B. For example, the position designation can be performed by an operation in which the viewer moves a mouse cursor to a desired position in the posting image and clicks or an operation in which the viewer taps a desired position in the posting image with a finger. The position that is designated in the posting image by the viewer may be a region where a product exists or a background region where the product does not exist. In addition, the position designated in the posting image by the viewer may be the same position as the poster designation position or may be a different position. The poster designation position that has been designated already can be identified by a designation position mark to be described later, and the viewer can set the same position as the poster designation position where the designation position mark is displayed as the viewer designation position.

The viewer designation position accepting unit 5 detects information indicating a position designated by the viewer in the posting image (hereinafter, referred to as "viewer designation position") in a similar manner as in the pester designation position accepting unit 2. As an example, in an XY coordinate system in which an upper and left corner of rectangular frames partitioning the posting image 32 illustrated in FIG. 3B is set as the origin, the viewer designation position accepting unit 5 detects coordinate information indicating a position where the viewer moves a mouse cursor and clicks, or a position that is tapped with a finger.

The viewing-side annexed posting information acquisition unit 6 acquires annexed posting information (hereinafter, referred to as "viewing-side annexed posting information") provided from the viewer of the posting image in an aspect of being annexed to the viewer designation position detected by the viewer designation position accepting unit 5 from the viewer terminal 300. For example, in succession to the operation of designating the desired position in the posting image, the viewer can perform an operation of posting the viewing-side annexed posting information to the posting information processing device 100. The viewing-side annexed posting information acquisition unit 6 acquires the viewing-side annexed posting information provided from the viewer terminal 300 through the posting operation performed by the viewer.

Figure 5:
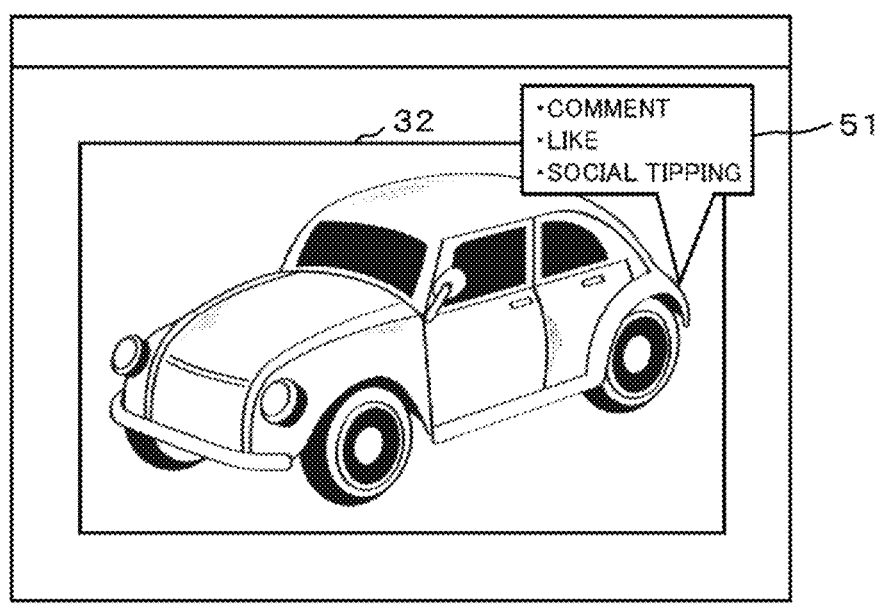
FIG. 5 is a view illustrating a screen example in an operation process when a viewer posts viewing-side annexed posting information.

FIG. 5 is a view illustrating a screen example in an operation process when the viewer posts the viewing-side annexed posting information. For example, when the viewer moves a mouse cursor to a desired position in the posting image 32 and clicks a right button, a pop-up menu 51 as illustrated in FIG. 5 is displayed at the operation position. The pop-up menu 51 may be displayed in correspondence with an operation in which the viewer long-presses a desired position in the posting image 32 with a finger, an operation of double-tapping the position, or the like. As selection items, "comment", "like", and "social tipping" are displayed in the pop-up menu 51, and the poster can post the annexed posting information by selecting any one of "comment", "like", and "social tipping".

When the operation of designating the desired position in the posting image is performed, it is possible to determine whether to display the pop-up menu 41 including the selection items for the poster as in FIG. 4 or the pop-up menu 51 including the selection items for the viewer as in FIG. 5 through comparison between the poster ID associated with the posting image that is being displayed, and the user ID associated with a user who is displaying the posting image (a poster ID or a viewer ID). For example, in a case where the poster ID associated with the posting image that is being displayed, and the user. ID associated with the user who is displaying the posting image match each other, the pop-up menu 41 as in FIG. 4 is displayed. On the other hand, in a case where the poster ID associated with the posting image that is being displayed, and the user ID associated with the user who is displaying the posting image do not match each other, the pop-up menu 51 as in FIG. 5 is displayed.

For example, in a case where the viewer has selected an item "comment", a screen for uploading an arbitrary comment as character information is displayed, and a desired comment can be uploaded to the posting information processing device 100 through the screen. The content of the uploading comment is arbitrary. For example, it is possible to post impressions, evaluations, questions, and the like for the product portion corresponding to the viewer designation position as the comment. In a case where the viewer selects an item "like", support information is posted. In addition, in a case where the viewer selects an item "social tipping", a screen for donating money or the like to the poster is displayed, and it is possible to post social tipping information by inputting a desired amount.

The viewing-side annexed posting information registration unit 7 registers annexed posting information (the viewing-side annexed posting information acquired from the viewer terminal. 300 by the viewing-side annexed posting information acquisition unit 6) provided from the viewer of the posting image in association with the viewer designation position detected by the viewer designation position accepting unit 5. That is, in a case where the annexed posting information is posted in an aspect of being annexed to the viewer designation position by the viewer (in a case where the annexed posting information is uploaded in succession to designation of a position in the posting image), the viewing-side annexed posting information registration unit 7 stores coordinate information of the viewer designation position and the uploaded viewing-side annexed posting information in the posting information storage unit 101 in association with the viewer ID and the posting image ID.

Figure 6:
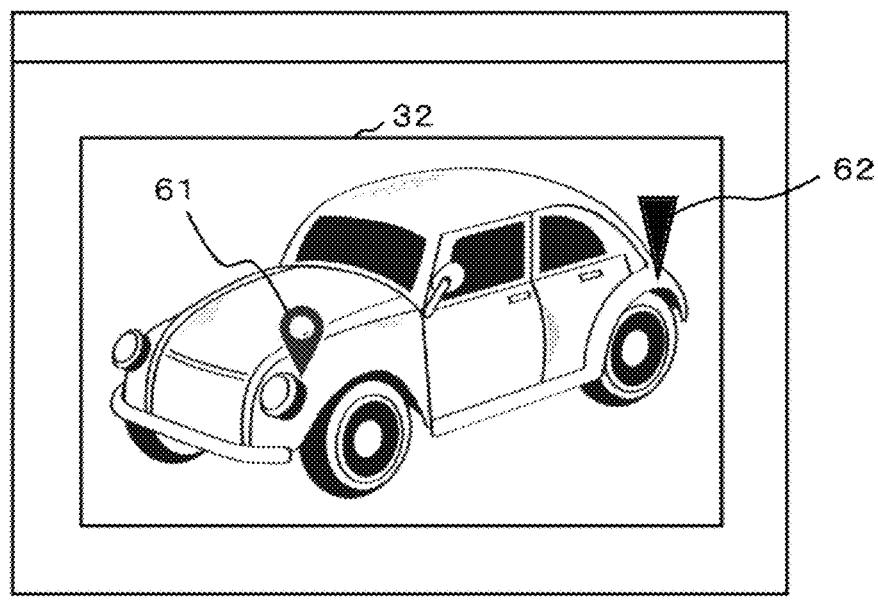
FIG. 6 is a view illustrating a screen example of a state in which a designation position mark is displayed in a state of being superimposed on a posting image.

The designation position mark display unit 9 displays a designation position mark indicating a designated position with respect to each of the poster designation position and the viewer designation position. Here, the designation position mark display unit 9 preferably displays the designation position mark shown in an aspect in which the poster designation position and the viewer designation position can be identified from each other. FIG. 6 is a view illustrating a screen example of a state in which the designation position mark is displayed to be superimposed on the posting image in an individual display screen of the posting image. As illustrated in FIG. 6, a designation position mark 61 indicating the poster designation position (hereinafter, referred to as "poster designation position mark"), and a designation position mark 62 indicating the viewer designation position (hereinafter, referred to as "viewer designation position mark") are configured by shapes different from each other, and both the marks are displayed in an aspect capable of being identified from each other.

The annexed posting information display unit 10 displays the posting-side annexed posting information or the viewing-side annexed posting information in correspondence with display position designation of the designation position mark by the user. For example, when the user moves a mouse cursor to the poster designation position mark 61 and clicks a left button, the annexed posting information display unit 10 reads out and displays the annexed posting information stored in the posting information storage unit 101 in association with the poster designation position (the posting-side annexed posting information is always included, and if the viewing-side annexed posting information posted by designating the same position as the poster designation position as the viewer designation position is associated with the viewer designation position, the viewing-side annexed posting information is also included). The annexed posting information display unit 10 may display the annexed posting information in correspondence with an operation in which the user single-taps the poster designation position mark 61 with a finger.

Similarly, when the user moves a mouse cursor to the viewer designation position mark 62 and clicks a left button, the annexed posting information display unit 10 reads out and displays the viewing-side annexed posting information stored in the posting information storage unit 101 in association with the viewer designation position. The annexed posting information display unit 10 may displays the annexed posting information in correspondence with an operation in which the user single-taps the viewer designation position mark 62 with a finger.

Figure 7:
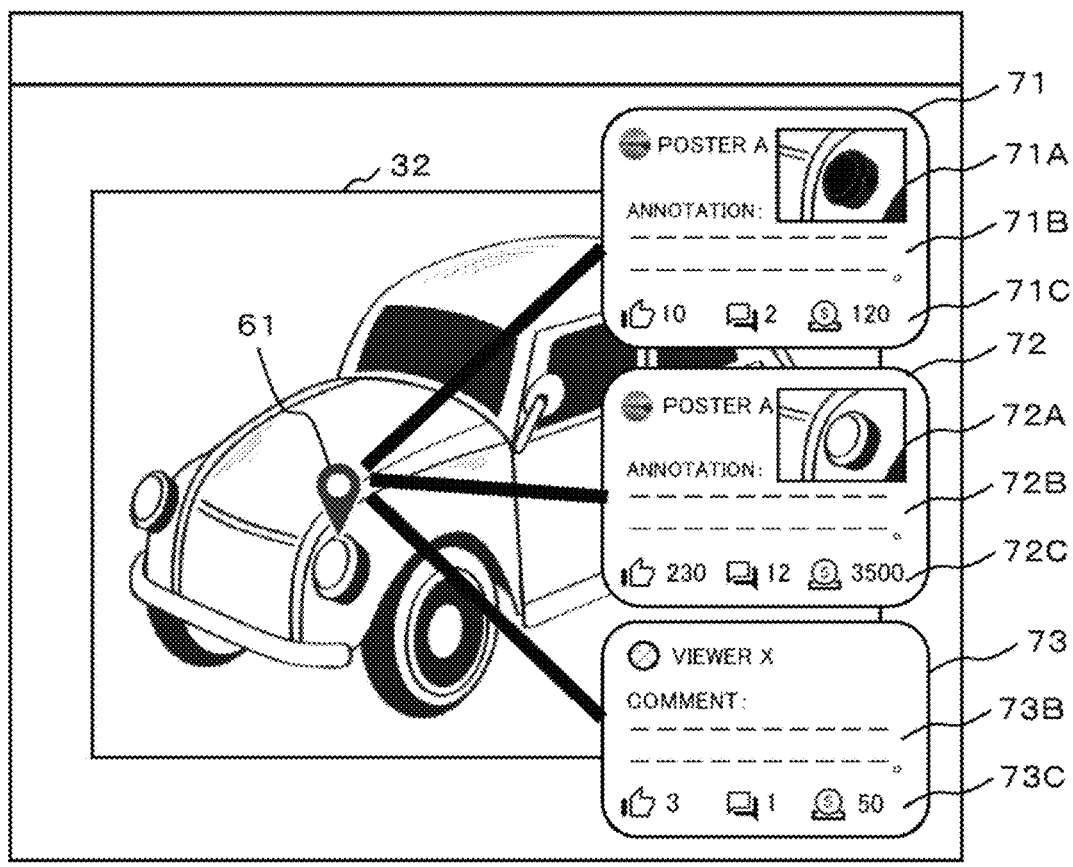
FIG. 7 is a view illustrating a screen example of a state in which annexed posting information is displayed.

FIG. 7 is a view illustrating a screen example in a state in which the annexed posting information is displayed by the annexed posting information display unit 10. In the example illustrated in FIG. 7, posting-side annexed posting information 71, 72 and viewing-side annexed posting information 73 which are registered in association with the poster designation position where the poster designation position mark 61 exists are displayed in a state of superimposing on the posting image. It is preferable to perform display in an aspect capable of identifying which is the posting-side annexed posting information and which is the viewing-side annexed posting information among a plurality of pieces of annexed posting information 71 to 73. For example, it is possible to change a line color or a background color, a line type, a line thickness, or the like with respect to a rectangular frame displaying the posting-side annexed posting information 71, 72, and a rectangular frame displaying the viewing-side annexed posting information 73.

The posting-side annexed posting information 71, 72 includes an image 71A, 72A of a production process in a product portion corresponding to the poster designation position, an annotation 71B, 72B, and attention degree information 71C, 72C indicating attention degree which are analyzed by the attention degree analysis unit 11 to be described later (from the left of the figure, the number of "like", the number of comments, and a total amount of social tipping are sequentially displayed). The viewing-side annexed posting information 73 includes a comment 73B and attention degree information 73C for the product portion corresponding to the viewer designation position (=the poster designation position). As described above, when the plurality of pieces of annexed posting information 71 to 73 are displayed in correspondence with designation of the display position of the poster designation position mark 61, the annexed posting information display unit 10 is configured to display the plurality of pieces of attention degree information 71C to 73C indicating the attention degree analyzed by the attention degree analysis unit 11 in addition to the images 71A, 72A of the production process which are posted from the poster, and the annotations 71B, 72B. Note that, the plurality of pieces of annexed posting information 71 to 73 may include the name or a nickname of the user, an icon image, and the like.

Note that, strictly, the image 71A, 72A of the production process, and the annotation 71B, 72B are posting-side annexed posting information, the attention degree information 71C, 72C not posting-side annexed posting information. However, since the attention degree information 71C and 72C are displayed in an aspect of being annexed to the image 71A and 72A of the production process and the annotation 71B and 72B, for convenience of explanation. For convenience of explanation, the above 71A, 72A, 71B, 72B, 71C and 72C are also referred to as the posting-side annexed posting information 71, 72.

In this embodiment, in addition to posting of the annexed posting information by designating an arbitrary position in the posting image 32 as illustrated in FIG. 4 and FIG. 5, the annexed posting information can also be posted by designating the annexed posting information 71 to 73 displayed as in FIG. 7. For example, the user moves a mouse cursor to a position of desired information among the plurality of pieces of annexed posting information 71 to 73 and clicks a right button, or performs an operation in which the position of the desired information among the plurality of pieces of annexed posting information 71 to 73 is long-pressed with a finger or an operation of double-tapping the position to display the same pop-up menu 41 or 51 as in FIG. 4 or FIG. 5, and to post arbitrary annexed posting information to the posting information processing device 100.

That is, the poster in this embodiment can post the posting-side annexed posting information by designating the position of the poster designation position mark 61, or can post the posting-side annexed posting information with respect to the viewing-side annexed posting information 73 associated with the poster designation position. The posting-side annexed posting information that is posted in the former case is the image 71A, 72A of the production process in a product portion, the annotation 71B, 72B, or the like. The posting-side annexed posting information that is posted in the latter case is a response comment for a comment, a question, or the like that is posted by the viewer, an image related to the response comment, or the like.

In addition, the viewer in this embodiment can post the viewing-side annexed posting information with respect to a product portion where the poster designation position mark 61 is displayed, or can post the viewing-side annexed posting information with respect to the posting-side annexed posting information 71, 72 that is posted with respect to the product portion from the poster. In any of the former case and the latter case, the viewing-side annexed posting information that is posted by the viewer is any one among a comment, "like", and a social tipping.

In a case where the poster of the posting image posts poster annexed posting information by designating the viewing-side annexed posting information 73, the posting-side annexed posting information registration unit 4 registers the poster annexed posting information provided from the poster in the posting information storage unit 101 in association with the designated viewing-side annexed posting information 73. In addition, in a case where the viewer of the posting image posts viewer annexed posting information by designating the posting-side annexed posting information 71, 72, the viewing-side annexed posting information registration unit 7 registers the viewer annexed posting information provided from the viewer in the posting information storage unit 101 in association with the posting-side annexed posting information 71, 72.

Here, the annexed posting information that is being displayed is registered in the posting information storage unit 101 in association with the poster designation position or the viewer designation position. Accordingly, registration of the annexed posting information in association with the designated annexed posting information corresponds to registration of the annexed posting information in association with the poster designation position or the viewer designation position. Note that, the posting-side annexed posting information registration unit 4 and the viewing-side annexed posting information registration unit 7 may register the annexed posting information provided from the poster or the viewer of the posting image in direct association with the poster designation position or the viewer designation position that is associated with the designated annexed posting information instead of registration in association with the designated annexed posting information.

The attention degree analysis unit 11 analyzes the degree of registration of the annexed posting information as attention degree from the viewer for each of the poster designation position and the viewer designation position. Specifically, the attention degree analysis unit 11 totals the number of comments of viewers, the number of "like", and the amount of the social tipping which are registered in association with a designated position. When the viewing-side annexed posting information such as the comment, "like", and the social tipping is posted with respect to the posting-side annexed posting information registered in association with the poster designation position, the number of comments, the number of "like", and the amount of the social tipping are totaled for every posting-side annexed posting information registered in association with the poster designation position. The totaled result is displayed as the attention degree information 71C, 72C, 73C.

The attention degree information 71C, 72C included in the posting-side annexed posting information 71, 72 represents a totaled result of the viewing-side annexed posting information ("like", a comment, and a social tipping) posted by additionally designating the posting-side annexed posting information 71, 72 displayed in a superimposing manner with the posting image 32 after a viewer designates the position of the poster designation position mark 61. In contrast, the attention degree information 73C included in the viewing-side annexed posting information 73 represents a totaled result of the viewing-side annexed posting information ("like", a comment, and a social tipping) that is posted by designating a position of the poster designation position mark 61 by the viewer.

Here, the posting-side annexed posting information 71 represents that the image 71A in a production process, and the annotation 71B are posted from the poster of the posting image 32, and represents that 10 pieces of support information of "like", two comments, and a social tipping equivalent to 120 yen have been posted from the viewer in an aspect of being annexed to, the posting-side annexed posting information 71. In addition, the viewing-side annexed posting information 73 represents that one comment, three pieces of support information of "like", and a social tipping equivalent to 50 yen have been posted from the viewer of the posting image 32 by designating the position of the poster designation position mark 61 as the viewer designation position.

Figure 8:
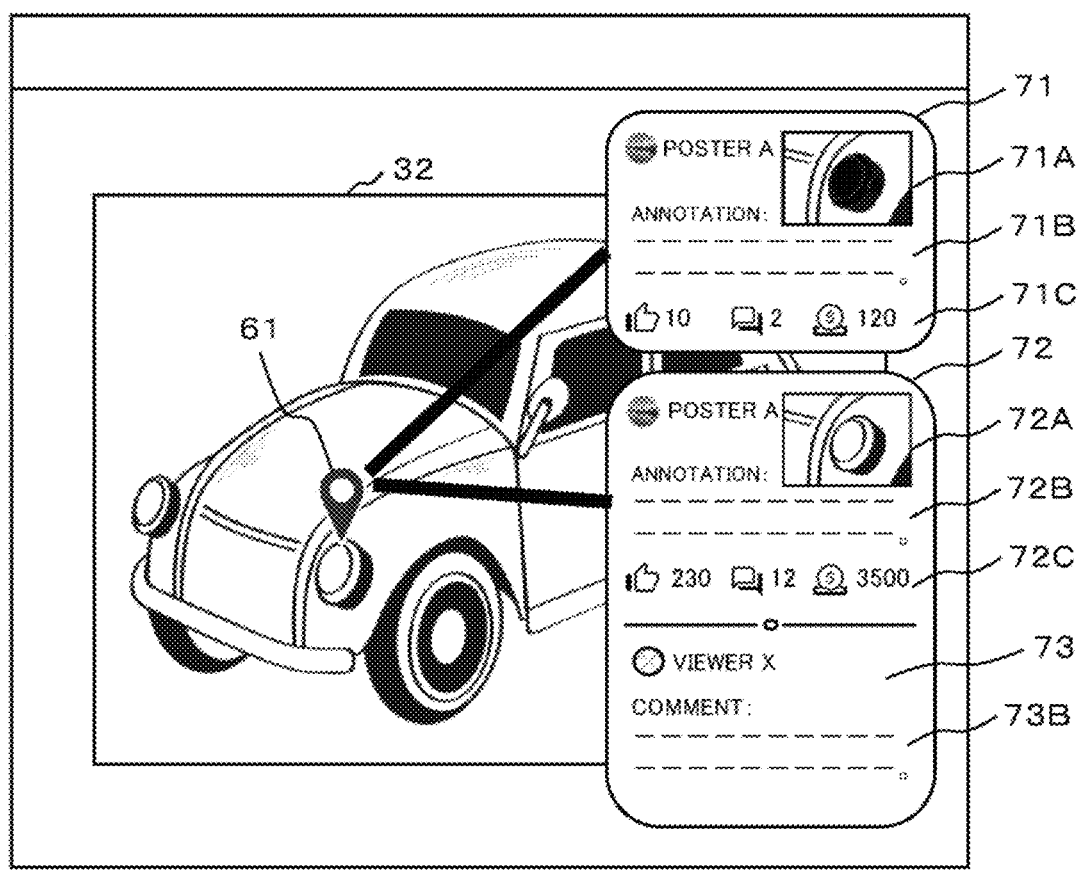
FIG. 8 is a view illustrating another screen example of a state in which the annexed posting information is displayed.

FIG. 8 is a view illustrating another screen example of a state in which annexed posting information is displayed by the annexed posting information display unit 10. In the above-described screen example in FIG. 7, all of the three pieces of annexed posting information 71 to 73 are posted by designating the position of the poster designation position mark 61, and the screen example illustrates a state in which the Three pieces of annexed posting information 71 to 73 registered in association with the designation position are independently displayed. In contrast, in the screen example in FIG. 8, the viewing-side annexed posting information 73 is annexed posting information that includes a comment posted by designating the second posting-side annexed posting information 72, and the screen example illustrates a state in which the viewing-side annexed posting information 73 is displayed in an aspect of being annexed to the posting-side annexed posting information 72. The aspect in which the viewing-side annexed posting information 73 is annexed to the posting-side annexed posting information 72 is an aspect in which the posting-side annexed posting information 72 and the viewing-side annexed posting information 73 are displayed in one rectangular frame, and the posting-side annexed posting information 72 as main information is displayed on an upper side, and the viewing-side annexed posting information 73 as subordinate information is displayed on a lower side.

Note that, FIG. 7 and FIG. 8 illustrate an example in which both the two pieces of posting-side annexed posting information 71, 72 including the images 71A, 72A in a production process are displayed at once, but there is no limitation to the example. For example, the two pieces of posting-side annexed posting information 71, 72 including the images 71A, 72A of the production process may be sequentially displayed. That is, only posting-side annexed posting information in any one of production processes in an ascending or descending order may be displayed, and when a user performs an operation of instructing tracing of a production process, posting-side annexed posting information in the subsequent production process may be displayed.

Figure 9:
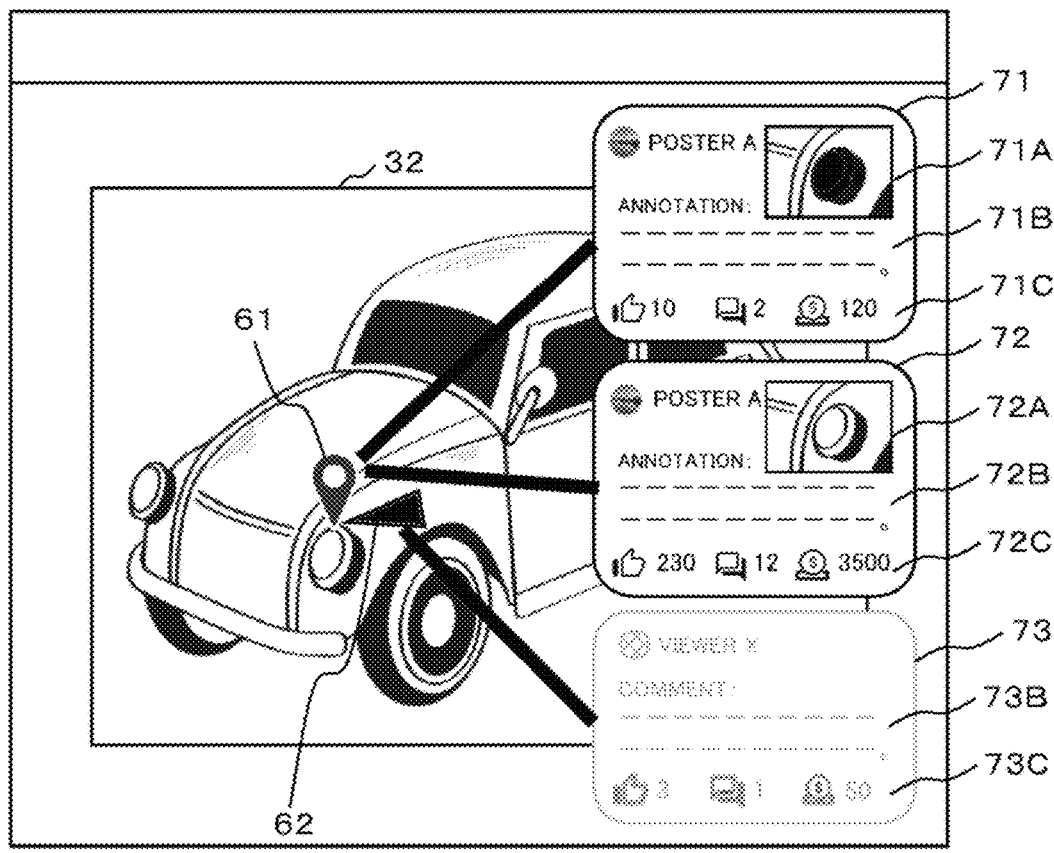
FIG. 9 is a view illustrating another screen example of a stale in which the annexed posting information is displayed.
Figure 10:
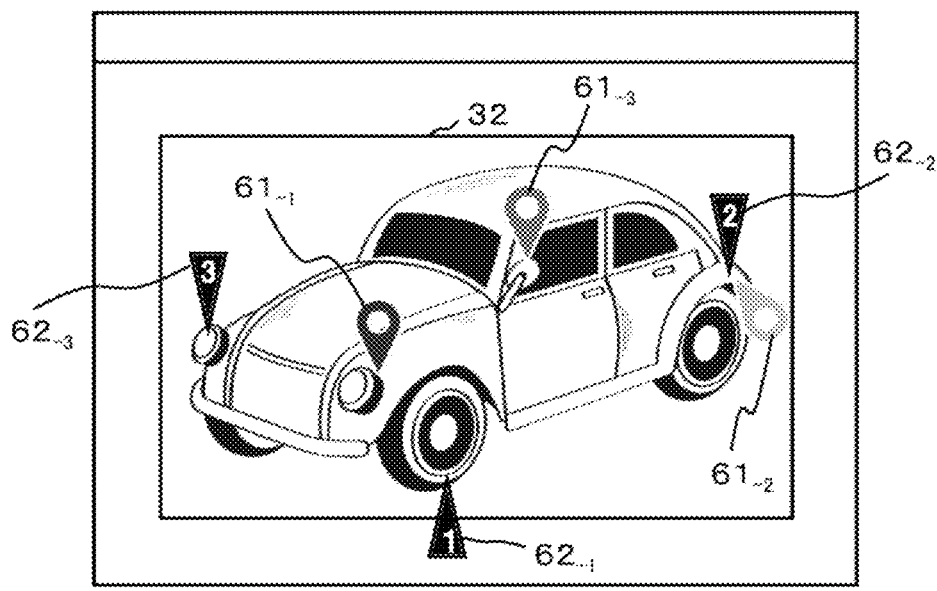
FIG. 10 is a view illustrating another display example of the designation position mark.

In addition, FIG. 7 illustrates the following example. Specifically, in a case where a viewer of a posting image registers the viewing-side annexed posting information 73 by setting the same position as the position of the poster designation position mark 61 as a viewer designation position, the designation position mark display unit 9 does not display the viewer designation position park 62 at the designation position, and in a case where an operation of designating a display position of the poster designation position mark 61 is performed, the annexed posting information display unit 10 displays the viewing-side annexed posting information 73 in combination with the posting-side annexed posting information 71, 72. In contrast, as illustrated in FIG. 9, in a case where a viewer of a posting image registers the viewing-side annexed posting information 73 by setting the same position as the position of the poster designation position mark 61 as the viewer designation position, the designation position mark display unit 9 may display the viewer designation position mark 62 at the designation position. In this case, the annexed posting information display unit 10 displays the two pieces of posting-side annexed posting information 71, 72 when an operation of designating the display position of the poster designation position mark 61 has been performed, and displays the viewing-side annexed posting information 73 when an operation of designating the display position of the viewer designation position mark 62 has been performed. FIG. 9 illustrates a state in which the two pieces of posting-side annexed posting information 71, 72 are displayed in correspondence with designation of the display position of the poster designation position mark 61, but viewing-side annexed posting information 73 is not displayed.

As described above in detail, in this embodiment, the posting-side annexed posting information provided by the poster of the posting image is registered in association with a position (poster designation position) designed by the poster in the posting image, and registers the viewing-side annexed posting information provided from the viewer of the posting image in association with the poster designation position and a position (viewer designation position) designated among other positions. In addition, when the poster designation position or the viewer designation position is designated, the posting-side annexed posting information or the viewing-side annexed posting information which is registered in association with the designation position is displayed.

According to this embodiment configured as described above, the poster of the posting image can post the annexed pasting information by designating, for example, a position where the poster desires to get evaluation, and when performing the posting, the posting-side annexed posting information is registered in association with the poster designation position. On the other hand, for example, the viewer of the posting image can post annexed posting information in association with the poster designation position after viewing the posting-side annexed posting information at the poster designation position or can post the annexed posting information by designating an another where the viewer desires to perform evaluation, a comment, or the lire, and when performing the posting, the viewing-side annexed posting information is registered in association with the viewer designation position. In addition, when the poster designation position or the viewer designation position is designated, the posting-side annexed posting information or the viewing-side annexed posting information which is registered in association with the designation position is displayed.

As described above, since the poster posts the posting-side annexed posting information by designating an arbitrary position in person, it is possible to make a situation in which the annexed posting information is likely to be posted from the viewer with respect to a position where the poster particularly desires to get evaluation in the posting image. In addition, the viewer can post the annexed posting information to a desired position (including the same as or different from the poster designation position) while referring to the posting-side annexed posting information. As described above, according, to this embodiment, it is possible to provide a posting mechanism that is expected to increase satisfaction for both the poster and the viewer of the posting image.

In addition, according to this embodiment, the viewer can post the viewing-side annexed posting information by designating the poster designation position, or can post the viewing-side annexed posting information by designating an another position different from the poster designation position. In a case where the viewing-side annexed posting information is posted by designating the poster designation position, it can be said that a product portion where the poster desires to get attention in the posting image and a portion where the viewer is interested in match each other. In contrast, in a case where the viewing-side annexed posting information is posted by designating a position different from the poster designation position, it can be said that a product portion where the poster desires to get attention in the posting image and a portion where the viewer is interested in do not match each other. According to this, it is possible to grasp agreement (empathy) or a deviation in consciousness between the poster and the viewer based on positions where the posting-side annexed posting information and the viewing-side annexed posting information are posted.

With regard to this, in this embodiment, designation position marks indicating designated positions are displayed with respect to the poster designation position and the viewer designation position, and the designation position marks shown in an aspect capable of identifying the poster designation position and the viewer designation position are displayed. According to this, it is possible to easily grasp agreement or a deviation in consciousness between the poster and the viewer based on whether or not a display position of the poster designation position mark and a display position of the viewer designation position mark match each other.

In addition, in this embodiment, the posting image is an image of a product such as a plastic model that is produced through a series of production processes, the poster is allowed to designate an arbitrary position, is allowed to post at least one of an image of a production process in the product portion that corresponds to the designation position and an annotation as the posting-side annexed posting information, and is register the posted posting-side annexed posting information in association with the poster designation position. In addition, when the poster designation position is designated, the posting side annexed posting information registered in association with the poster designation position is displayed.

According to this, the poster can wait evaluation from the viewer after simply posting an image of a product that is a finished product, and can post characteristics of a specific portion, tips for production of the portion, a point to which particular attention is given in production, difficulties and ingenuity for expression of a work, or the like as an image in a production process or an annotation to make an appeal to the viewer. In addition, the viewer can view the image of the product as a finished product, and can also know a certain portion is produced with specific ingenuity in the production process, and thus the viewer can obtain more interested information in comparison to viewing of the image of the finished product.

In addition, in this embodiment, there is provided a function of registering the posting-side annexed posting information or the viewing-side annexed posting information in association with the posting-side annexed posting information registered in association with the poster designation position, or a function of registering the posting-side annexed posting information or the viewing-side annexed posting information in association with the viewing-side annexed posting information registered in association with the viewer designation position. According to this, for example, the viewer can post the viewing side annexed posting information by designating an arbitrary portion in the posting image of the finished product, and also can post the viewing-side annexed posting information by designating the posting-side annexed posting information including an image of a production process or an annotation. Accordingly, the poster can get an evaluation for the production process in addition to an evaluation for the finished product.

With regard to this, in this embodiment, when the annexed posting information display unit 10 displays the posting-side annexed posting information (for example, the posting-side annexed posting information 71, 72 in FIG. 7 to FIG. 9) in correspondence with display position designation of the designation position mark, attention degree information (the number of "like", the number of comments, a total amount of a social tipping) indicating attention degree of the viewer for the posting-side annexed posting information is allowed to be displayed in a state of being included in the posting-side annexed posting information. In addition, when the annexed posting information display unit 1C displays the viewing-side annexed posting information (for example, the viewing-side annexed posting information 73 in FIG. 7 or FIG. 9) in correspondence with display position designation of the designation position mark, attention degree information indicating attention degree of the viewer for a product portion at the designation position is allowed to be displayed in a state of being included in the viewing-side annexed posting information. According to this, it is possible to provide an evaluation for the product portion at the designation position of the finished product, and an evaluation for the production process of the product portion in an easy-to-understand manner.

Note that, as described above, in addition to displaying of the plurality of pieces of attention degree information 71C to 73C when the annexed posting information display unit 10 displays the annexed posting information 71 to 73, the designation position mark display unit 9 may display a designation position mark shown in an aspect in which attention degree analysed by the attention degree analysis unit 11 for each of the poster designation position and the viewer designation position can be visually recognized with respect to each of the poster designation position and the viewer designation position. In this case, even when the annexed posting information 71 to 73 are not displayed as in FIG. 7 to FIG. 9 by designating a display position of the designation position park, in a state in which only the designation position mark is displayed, the attention degree of the viewer for the position of the designation position mark can be allowed to be recognized.

For example, an attention degree score is calculated by a predetermined function in correspondence with one or a combination of the number of comments, the number of "like", and the total amount of the social tipping which are totaled by the attention degree analysis unit 11, and the designation position mark can be set to be displayed in an aspect capable of visually recognizing attention degree in correspondence with a value of the attention degree score. Here, in a case where the viewing-side annexed posting information (a comment, "like", and a social tipping) associated with the designation position, and the viewing-side annexed posting information associated with the poster annexed posting information or the viewer annexed posting information which is associated with the designation position exist, the attention degree score of the designation position is calculated by integrating both pieces of the viewing-side annexed posting information. According to the example in FIG. 7, with regard to the poster designation position in which the poster designation position mark 61 is displayed, the attention degree score is calculated on the basis of the three pieces of attention degree information 71C to 73C.

As an aspect of the designation position mark capable of visually recognizing the attention degree expressed by the attention degree score, for example, the designation position mark, can be set to be displayed for each color in correspondence with the value of the attention degree score. Alternatively, ranking may be performed in correspondence with the value of the attention degree score, and a numerical value indicating the rank may be displayed in combination with the designation position mark. Here, the poster designation position and the viewer designation position may be separately ranked, or the poster designation position and the viewer designation position may be ranked in a unified manner. Alternatively, display per each color may be performed with respect to the poster designation position mark, and rank display may be performed with respect to the viewer designation position mark. FIG. 1C is a view illustrating a display example in this case, and three poster designation position marks $61_{-1}$ to $61_{-3}$ displayed per each color, and three ranked viewer designation position marks $62_{-1}$ to $62_{-3}$ are displayed.

Note that, in the above-described embodiment, description has been given of an example in which after the annexed posting information is registered in association with the poster designation position or the viewer designation position, the designation position mark is always displayed with respect to the designation position, but the invention is not limited to the example. For example, in the poster designation position, the designation position mark display unit 9 may set the poster designation position mark as non-display in an initial state, and may display the poster designation position mark in correspondence with an instruction from the poster or the viewer (switched from the non-display state to a display state).

In this case, the viewer can view the posting image in a state in which the poster designation position is not visualized, and can post viewing-side annexed posting information by designating a position of interest by relying on the own sensibility without being influenced by the poster's intension display. In addition, the viewer can confirm whether or not the position of interest relying on the own sensibility matches a position devised by the poster in production by causing the poster designation position mark to be displayed after posting the viewing-side annexed posting information or after determining a posting position. For example, when a viewer performs posting with respect to a posting image of a poster who has a good reputation for making a plastic model from the above-described viewpoint, the viewer can enjoy testing for sharpness of the viewer's sensibility, ability to produce the plastic model, and the like.

In addition, in the above-described embodiment, the plastic model has been exemplified as an example of the product, but there is no limitation thereto. Any product that is produced through a series of production processes is applicable. Examples thereof include products such as handcrafts, handmade crafts by DIY (Do It Yourself), leathercrafts, balloon art, ceramics, and flower arrangement.

In addition, in the above-described embodiment, description has been given of an example in which an image of a finished product of a product is set as the posting image, and an image of a production process is set as the posting-side annexed posting information, but the invention is not limited to the example. For example, an image of a production process which is recommended by the poster may be set as the posting image, and an image of another production process or an image of a finished product may be set as the posting-side annexed posting information. Alternatively, in the finished product, an image viewed from an arbitrary angle may be set as the posting image, and an image viewed from another angle may be set as the posting-side annexed posting information.

In addition, in the above-described embodiment, description has been given on the assumption that the posting image is a still image, but the posting image may be a moving image. Similarly, an image of a production process which is posted as the posting-side annexed posting information may be a still image or a moving image. In addition, in the above-described embodiment, an image, an annotation, a comment, "like", and a social tipping have been described as an example of the annexed posting information, but there is no limitation to the example. For example, a voice may be posted as the annexed posting information.

In addition, according to the above-described embodiment, there is provided a mechanism in which the poster and the viewer can perform communication by giving and taking the posting-side annexed posting information and the viewing-side annexed posting information with respect to the posting image, but in addition to this, a production request function in which the viewer can make a request for the poster to produce a product may be provided. The viewer can make a request for production of the product in a comment that is posted as the viewing-side annexed posting information, but the product request content is displayed and is widely disclosed to a third party. Therefore, it is considered to provide a function capable of making a production request in a private manner. In addition, it is possible to provide a function in which the viewer can register an interest poster so that the viewer can follow the poster, and the viewer can create a fan club or community and can participates in the fan club or the community.

The above-described embodiment merely illustrates an example of an embodiment for carrying the invention, and the technical scope of the invention should not be construed in a limited manner due to the example. That is, the invention can be executed in various aspects without departing from the gist of the invention, or main characteristics thereof.

What is claimed is:

1. A posting information processing device applied to a system that enables additional information to be further posted in a state of being annexed to a posting image, comprising:
   a posting-side annexed posting information registration unit that registers posting-side annexed posting information that is annexed posting information provided from a poster of the posting image in association with a poster designation position that is a position designated by the poster in the posting image;
   a viewing-side annexed posting information registration unit that registers viewing-side annexed posting information that is annexed posting information provided from a viewer of the posting image in association with a viewer designation position that is a position designated by the viewer among the poster designation position and other positions in the posting image;
an attention degree analysis unit that analyzes the degree of registration of the annexed posting information as attention degree from the viewer for each of the poster designation position and the viewer designation position;
a designation position mark display unit that displays a poster designation position mark indicating a position designated by the poster and a viewer designation position mark indicating a position designated by the viewer with respect to each of the poster designation position and the viewer designation position; and
an annexed posting information display unit that displays the posting-side annexed posting information or the viewing-side annexed posting information in correspondence with designation of a display position of the poster designation position mark or the viewer designation position mark,
wherein the viewing-side annexed posting information registration unit performs a function selected by the viewer among a viewing-side first function of registering the viewing-side annexed posting information in association with the viewer designation position of the posting image and a viewing-side second function of registering the viewing-side annexed posting information in association with the posting-side annexed posting information registered in association with the poster designation position in a case where the same position as the poster designation position is designated by the viewer in the posting image;
in a case where the viewing-side annexed posting information is registered in association with any one designation position of the poster designation position or the viewer designation position, and the viewing-side annexed posting information is further registered in association with the posting-side annexed posting information or the viewing-side annexed posting information associated with the one designation position, the attention degree analysis unit analyzes the attention degree with respect to the one designation position by integrating the attention degrees to a plurality of pieces of the viewing-side annexed posting information registered in the one designation position; and
the designation position mark display unit displays a plurality of the viewer designation position marks in the mutually same aspect, while displaying the poster designation position mark and the viewer designation position mark in mutually different aspects to thereby display these designation position marks in the aspects mutually identifiable of whether the position is designated by the poster or is designated by the viewer, and the designation position mark display unit displays a designation position mark in an aspect capable of visually recognizing the attention degree analyzed by the attention degree analysis unit.

2. The posting information processing device according to claim 1, wherein the posting image is an image of a product produced through a series of production processes, and
the posting-side annexed posting information registration unit registers the posting-side annexed posting information including at least one of an image of a production process in a production portion corresponding to the poster designation position and an annotation in association with the poster designation position.

3. The posting information processing device according to claim 1,
wherein the viewing-side annexed posting information registration unit registers the viewing-side annexed posting information in association with the viewer designation position that is the same position as the poster designation position in a case where a position of the poster designation position mark is designated by the viewer and the viewing-side first function is selected by the viewer, and registers the viewing-side annexed posting information in association with the posting-side annexed posting information in a case where the posting-side annexed posting information displayed by the annexed posting information display unit in correspondence with designation of a position of the poster designation position mark is designated by the viewer and the viewing-side second function is selected by the viewer.

4. The posting information processing device according to claim 1,
wherein the posting-side annexed posting information registration unit performs a function selected by the poster among a posting-side first function of registering the posting-side annexed posting information in association with the poster designation position of the posting image and a posting-side second function of registering the posting-side annexed posting information in association with the viewing-side annexed posting information registered in association with the viewer designation position or the posting-side annexed posting information.

5. The posting information processing device according to claim 1, wherein the designation position mark display unit displays the viewer designation position mark in addition to the poster designation position mark in a case where the position of the poster designation position mark is designated by the viewer and the viewing-side first function is selected by the viewer.

6. The posting information processing device according to claim 1,
wherein the designation position mark display unit displays the poster designation position mark and the viewer designation position mark in an aspect capable of identifying the poster designation position mark and the viewer designation position mark from each other regardless of whether the poster designation position and the viewer designation position are the same or not.

7. The posting information processing device according to claim 1,
wherein in the poster designation position, the designation position mark display unit sets the designation position mark as non-display in an initial state, and displays the designation position mark in correspondence with an instruction from the poster or the viewer.

8. The posting information processing device according to claim 1,
wherein the attention degree analysis unit performs ranking of the attention degree with respect to the poster designation position and the viewer designation position in correspondence with the degree of registration of the annexed posting information with respect to each of the poster designation position and the viewer designation position, and
wherein the designation position mark display unit displays a numerical value indicating a rank analyzed by the attention degree analysis unit in combination with the designation position mark.

9. The posting information processing device according to claim 8,
wherein the attention degree analysis unit separates the poster designation position and the viewer designation position, and separately performs the ranking of the attention degree with respect to the poster designation position and the ranking of the attention degree with respect to the viewer designation position.

10. A posting information processing method executed by a posting information processing device applied to a system that enables additional information to be further posted in a state of being annexed to a posting image, comprising:
registering posting-side annexed posting information that is annexed posting information provided from a poster of the posting image by a posting-side annexed posting information registration unit of the posting information processing device in association with a poster designation position that is a position designated by the poster in the posting image;
registering viewing-side annexed posting information that is annexed posting information provided from a viewer of the posting image by a viewing-side annexed posting information registration unit of the posting information processing device in association with a viewer designation position that is a position designated by the viewer among the poster designation position and other positions in the posting image;
analyzing the degree of registration of the annexed posting information as attention degree from the viewer for each of the poster designation position and the viewer designation position by an attention degree analysis unit of the posting information processing device;
displaying a poster designation position mark indicating a position designated by the poster and a viewer designation position mark indicating a position designated by the viewer by a designation position mark display unit of the posting information processing device with respect to each of the poster designation position and the viewer designation position; and
displaying the posting-side annexed posting information or the viewing-side annexed posting information in correspondence with designation of a display position of the poster designation position mark or the viewer designation position mark by an annexed posting information display unit of the posting information processing device,
wherein the viewing-side annexed posting information registration unit performs a function selected by the viewer among a viewing-side first function of registering the viewing-side annexed posting information in association with the viewer designation position of the posting image and a viewing-side second function of registering the viewing-side annexed posting information in association with the posting-side annexed posting information registered in association with the poster designation position in a case where the same position as the poster designation position is designated by the viewer in the posting image; and
in a case where the viewing-side annexed posting information is registered in association with any one designation position of the poster designation position or the viewer designation position, and the viewing-side annexed posting information is further registered in association with the posting-side annexed posting information or the viewing-side annexed posting information associated with the one designation position, the attention degree analysis unit analyzes the attention degree with respect to the one designation position by integrating the attention degrees to a plurality of pieces of the viewing-side annexed posting information registered in the one designation position; and
the designation position mark display unit displays a plurality of the viewer designation position marks in the mutually same aspect, while displaying the poster designation position mark and the viewer designation position mark in mutually different aspects to thereby display these designation position marks in the aspects mutually identifiable of whether the position is designated by the poster or is designated by the viewer, and the designation position mark display unit displays a designation position mark in an aspect capable of visually recognizing the attention degree analyzed by the attention degree analysis unit.

\* \* \* \* \*